US006956498B1

(12) United States Patent
Gauthier et al.

(10) Patent No.: US 6,956,498 B1
(45) Date of Patent: Oct. 18, 2005

(54) SYSTEM FOR REMOTE OPERATION OF A PERSONAL HYGIENE OR SANITARY APPLIANCE

(75) Inventors: Jerome M. Gauthier, Roselle, IL (US); Nhon T. Vuong, Lombard, IL (US)

(73) Assignee: Sloan Valve Company, Franklin Park, IL (US)

( * ) Notice: Subject to any disclaimer, the term of this patent is extended or adjusted under 35 U.S.C. 154(b) by 451 days.

(21) Appl. No.: 09/704,244

(22) Filed: Nov. 2, 2000

(51) Int. Cl.$^{7}$ .......................... G08C 19/00; H04Q 1/00; G05B 19/00; G06F 7/00; G08B 29/00

(52) U.S. Cl. ........................... 340/825.69; 340/825.72; 340/825.29; 340/5.61; 251/129.04; 236/12.12

(58) Field of Search ...................... 340/825.69, 825.72, 340/825.29, 5.61, 5.62, 5.63, 5.64, 573, 565, 340/539.14, 539.19; 251/129.04; 236/12.12; 315/149

(56) References Cited

U.S. PATENT DOCUMENTS 4,872,485 A 10/1989 Laverty, Jr.
4,914,758 A 4/1990 Shaw
4,916,613 A 4/1990 Lange et al.
5,033,508 A 7/1991 Laverty, Jr.
5,063,955 A 11/1991 Sakakibara
5,086,526 A 2/1992 Van Marcke
5,133,089 A 7/1992 Tsutsui et al.
5,170,361 A * 12/1992 Reed .......................... 700/283
5,170,944 A 12/1992 Shirai
5,175,892 A 1/1993 Shaw
5,184,642 A 2/1993 Powell
5,187,816 A 2/1993 Chiou
5,202,666 A 4/1993 Knippscheer
5,217,035 A 6/1993 Van Marcke
5,224,685 A 7/1993 Chiang et al.
5,243,717 A 9/1993 Yasuo
5,315,719 A 5/1994 Tsutsui et al.
5,341,839 A 8/1994 Kobayashi et al.
5,362,026 A 11/1994 Kobayashi et al.
5,482,250 A 1/1996 Kodaira
5,504,950 A 4/1996 Natalizia et al.
5,570,869 A 11/1996 Diaz et al.
5,588,636 A * 12/1996 Eichholz et al. ....... 251/129.04
5,595,342 A * 1/1997 McNair et al. ............... 236/51
5,610,589 A * 3/1997 Evans et al. ............. 340/573.1

(Continued)

*Primary Examiner*—Michael Horabik
*Assistant Examiner*—Nam Nguyen
(74) *Attorney, Agent, or Firm*—Cook, Alex, McFarron, Manzo, Cummings & Mehler, Ltd.

(57) ABSTRACT

A system for remote operation of a personal hygiene appliance which includes any one of a toilet flush valve, a faucet, a shower head, a soap dispenser, a hand dryer, and a paper towel dispenser, includes an electric operator associated with each appliance for causing operation thereof. A radio receiver is associated with each appliance, which, upon receipt of a message unique to that appliance, will cause its operation. There is a triggering device, remote from the appliance, which may be for example an infrared sensor or a manually operated switch for signaling an intent to cause operation of the appliance. There is a transmitter and a receiver associated with the triggering device. Each triggering device associated transmitter is programmed to transmit a message unique to that specific appliance. There is an indicator located at each triggering device and a receiver associated with the indicator. When the triggering device transmits a message unique thereto, it is received at the appliance receiver which will cause operation of the appliance and will cause the appliance transmitter to send an acknowledgment message back to the triggering device receiver, which in turn will activate the indicator indicating that the transmitted message was received.

20 Claims, 2 Drawing Sheets

U.S. PATENT DOCUMENTS 5,627,375 A 5/1997 Hsieh
5,730,165 A 3/1998 Philipp
5,758,688 A 6/1998 Hamanaka et al.
5,769,120 A * 6/1998 Laverty et al. ........ 251/129.04
5,790,024 A * 8/1998 Ripingill et al. ............ 340/565
5,812,059 A * 9/1998 Shaw et al. .............. 340/573.1
5,813,655 A * 9/1998 Pinchott et al. ........ 251/129.04
5,819,336 A 10/1998 Gilliam et al.
5,868,311 A 2/1999 Cretu-Petra
5,963,624 A * 10/1999 Pope ....................... 379/110.1
6,075,454 A * 6/2000 Yamasaki .................. 340/5.61
6,250,601 B1 * 6/2001 Kolar et al. ........... 251/129.04
6,283,139 B1 * 9/2001 Symonds et al. .......... 137/78.3
6,286,764 B1 * 9/2001 Garvey et al. ........... 236/12.12
6,337,635 B1 * 1/2002 Ericksen et al. ....... 340/825.69
6,522,078 B1 * 2/2003 Okamoto et al. ........... 315/149

* cited by examiner

SYSTEM FOR REMOTE OPERATION OF A PERSONAL HYGIENE OR SANITARY APPLIANCE

THE FIELD OF THE INVENTION

The present invention relates to a system for the remote operation of one or more sanitary appliances normally found in a public washroom. Such appliances may include a urinal flush valve, a water closet flush valve, a faucet, a shower head, a soap dispenser, a paper towel dispenser, a hand dryer, or any other appliance which may be found in such an environment. Typically, such appliances are operated by an individual through a sensor or a manual switch which is located at the appliance and wired to the appliance electric operator.

There are environments in which it is not possible or desirable to have a hard-wired connection between the triggering device, which will cause operation of the appliance, and the appliance itself. For example, in a water closet the electric operator for a flush valve may be behind a partition and it is not practical to have the triggering device hard-wired to the flush valve. Similarly, there may be instances in which the flush valve for a urinal is behind a wall and it is not cost effective to have a hard-wire connection between the device instituting operation of the flush valve and the flush valve itself. The present invention provides a radio link which replaces the hard-wire connection. The invention further includes the ability to acknowledge receipt of an operational message so that at the triggering device, whether it be an infrared sensor or a pushbutton, the individual will have visual evidence that the message to cause operation of the appliance has been received and acknowledged.

Further, in some washroom environments, for example in institutions, it may be desirable to have a master control which monitors the use and operation of all of the sanitary appliances within a certain area. Again, it is desirable in such instance to eliminate the hard- wire connections and to replace them with a radio communication link. The use of hard-wire connections may be difficult in such an environment and may subject the wiring to vandalism, corrosion and malfunction. Replacement of the hard-wire connection with a radio link has many advantages, including cost, security and reliability.

The present invention provides a radio communication link between a single personal hygiene or sanitary appliance of the type described and the triggering device, whether it be a sensor or a mechanically-operated switch, as well as a control system for multiple such devices within a predetermined area. All of the connections between the appliance itself and the means for causing its operation are by a radio link. Similarly, in the instance of multiple such devices, and a computer controlled or microprocessor which determines when and for how long any such appliance will be operated, the communication links are also by radio.

SUMMARY OF THE INVENTION

The present invention relates to a system for operating appliances such as flush valves, faucets and the like, and more specifically to the use of a radio communication link between the triggering device for such an appliance and the electric operator that causes it to function.

A primary purpose of the invention is to provide an operating system for personal hygiene and/or sanitary appliances in which hard-wiring between the sensor or activating device and the appliance itself is eliminated and replaced by a radio communication link.

Another purpose is a control system for appliances such as described in which a multiple of such appliances are controlled by a single microprocessor through a radio communication link.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

It is the present practice in most public washrooms, including those found in institutions, for the various sanitary appliances and/or water flow control plumbing devices to be hard wired to the triggering device which causes their operation. More specifically, in such an environment, and using a toilet flush valve as an example, there is a hard wire connection between the electric operator of the valve and the triggering device whether it be a sensor, such as an infrared sensor, or a pushbutton in which the user of the device manually operates the pushbutton to ensure its operation. The flush valve may be associated with a urinal or it may be associated with a water closet. Similarly, there are hard wire connections to operate other appliances such as faucets, shower heads, soap dispensers, paper towel dispensers, and hand dryers. The present invention is applicable to any personal hygiene and/or sanitary appliance of the above type and the triggering device, whether it be a sensor, such as an infrared sensor, or a switch which is manually operated by the individual who intends the appliance to be utilized. Specifically, the present invention replaces a hard wire connection with a radio communication link. FIGS. 1A, 1B, 1C, and 1D show several appliances of this type and the use of two distinct type of triggering devices, one an infrared sensor and the other a pushbutton. Either triggering device may be used with any appliance and there are also instances in which both triggering devices may be utilized with such an appliance, with the manual device being used as an override or for maintenance purposes.

Figure 1A:
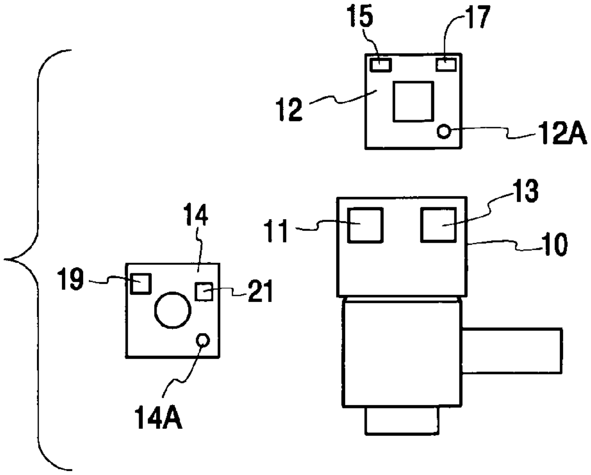
FIGS. 1A, 1B, 1C and 1D illustrate several individual sanitary appliances with individual triggering devices therefore.

FIG. 1A shows a flush valve 10 which may be associated with either a urinal or a water closet and which may be either battery operated or connected to a local power source. The flush valve may be of the type shown in U.S. Pat. Nos. 5,169,118 and 5,244,179, both owned by the assignee of the present application, Sloan Valve Company of Franklin Park, Ill. The disclosures of the '118 and '179 patents are herein incorporated by reference. The flush valve 10 will include an electric operator, such as a solenoid, powered either by battery or by connection to local power which, upon actuation, will cause the flush valve to pass a measured amount of water to either a water closet or a urinal. The flush valve 10 is diagrammatically shown FIG. 1A and in the preferred embodiment of the invention will include, within the unit itself, the described electric actuator, battery power if desired, and in addition, a radio frequency transmitter 11 and a radio frequency receiver 13. Typically, these devices will operate in the 400 MHz range and the normal maximum power that would be used at the transmitter is 200 milliwatts. What is necessary is that there be a range of approximately 100 ft.

Associated with the flush valve 10 and the described radio frequency transmitter 11 and receiver 13 is an infrared sensor 12 which is shown as a part of the flush valve apparatus in the '118 and '179 patents, but herein is disclosed at a location separate and apart from the flush valve. The sensor 12 will also include a radio frequency transmitter 15 and a radio frequency receiver 17 operating in the described frequency range and with the described power requirements. These may be battery operated or they may be connected to local power.

There is also a pushbutton actuator 14 which again will have associated with it a radio frequency transmitter 19 and a radio frequency receiver 21, as described. Both the infrared sensor 12 and the pushbutton 14, with the associated RF radio equipment, further have a light emitting diode indicator shown at 14*a*, as associated with the pushbutton, and at 12*a*, as associated with the infrared sensor 12.

In operation, if the sensor 12 detects an individual at either a urinal or a water closet, the sensor is programmed to operate the flush valve a predetermined time after the sensor no longer detects an individual at the particular toilet appliance. In the present instance, the sensor will send a radio frequency signal to the flush valve 10 and this signal will have a unique address, an address peculiar to the particular flush valve which is to be operated. As an example, the transmitter associated with the sensor 12 may have an activation address of 100 and this may be in either digital or analog form, with the number 100 being purely for illustrative purposes. The receiver at the flush valve 10 is set to receive that specific address. Upon receipt of the address the flush valve electric operator will begin its operating cycle. Simultaneously, the transmitter associated with flush valve 10 will transmit a message having an address represented by the number 105. The receiver at the sensor 12 is set to receive only the unique message having the address 105 and when this message is received, characterized as an acknowledgment message, it will cause the LED 12*a* to be illuminated. Thus, the sensor operates to send an intent message to the flush valve by an RF signal. The flush valve receiver is set to receive only that message and when such message is received, it responds with an acknowledgment message which is sent back to the sensor, indicating that the instruction has been received.

The equipment at the pushbutton 14 is the same as at the sensor 12 and the addresses are the same for both the transmitter and receiver. Thus, the pushbutton 14 may be used as an alternate to the sensor and would be particularly useful as an override device or if for maintenance purposes it was desired to operate the flush valve.

What is important is that there is a unique message for a particular appliance, both for sending an intent instruction and for sending and receiving an acknowledgment instruction. Thus, the entire communication between the triggering device and the appliance is at an RF frequency of approximately of 400 MHz.

Figure 1D:
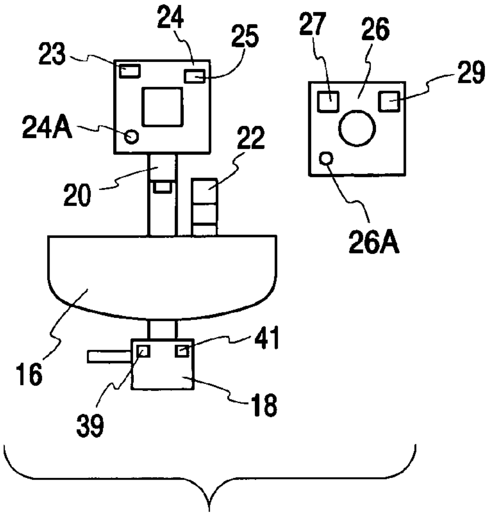

FIG. 1D shows a similar arrangement for operation of a soap dispenser and a faucet. There is a sink 16 beneath which is an electric operator unit 18 to control operation of a faucet 20 and a transmitter 39 and receiver 41 included within the same enclosure as operator unit 18. There is a soap dispenser 22 also associated with the sink 16, which dispenser will have an electric operator as well as a transmitter and receiver. A sensor is indicated at 24 for the faucet, and as described in connection with FIG. 1A, will have both a transmitter 23 and receiver 25 included within the same enclosure. Similarly, there is a sensor 26 which is suitable for use with the soap dispenser 22 and again will have a transmitter 27 and receiver 29 associated with it. There are indicators 24*a* associated with the faucet sensor and an indicator 26*a* associated with the soap dispenser sensor.

Again using the same number sequence as representative of address, the faucet sensor 24 may have a transmitter address of 110 and a receiver address of 115. The receiver at the faucet control 18 will have its address set at 110 and its transmitter address set at 115. Thus, there is only communication between these two elements, the sensor and the faucet control, and with addresses unique to two-way communication therebetween. The same is true with the soap dispenser and its associated sensor 26. Communication between these two elements will be at an address peculiar to the soap dispenser and to its sensor so that there is no possibility of any other appliance within the washroom being operated when it is desired to operate particular soap dispenser.

Figure 1B:
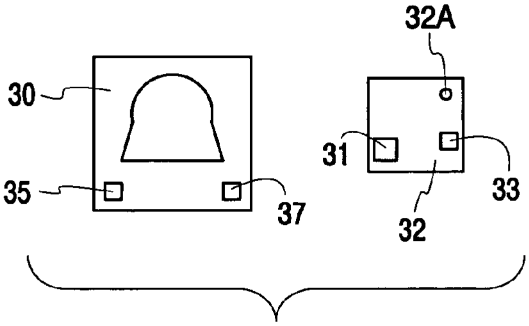

Similarly, in FIG. 1B, there is a hand dryer 30 and the hand dryer 30 will have a sensor 32, again with a transmitter 31 and receiver 33, just as the hand dryer 30 has a transmitter 35 and receiver 37. These particular radio communication elements will again have addresses peculiar to the appliance and its sensor so that operation of the hand dryer only results when its electric operator is activated by the receiver which receives a signal from the sensor 30 and again there will be an answer back or acknowledgment message sent to the sensor so that its indicator 32*a* will be operated.

Although the appliances in FIGS. 1B and 1D only show operation by an infrared sensor, it should be understood that there may also be pushbutton or other manually operated devices associated with any one or all of a faucet, soap dispenser, hand dryer or paper towel dispenser.

Figure 1C:
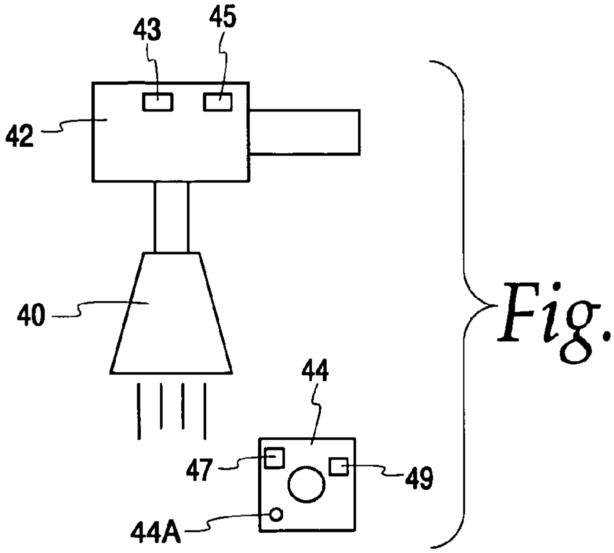

FIG. 1C shows a shower head 40 having an electric operator 42, and a transmitter 43 and receiver 45 associated therewith. A sensor is shown at 44 with an indicator 44*a*. The appliance and its associated sensor in FIG. 1C operate in the same manner as in FIGS. 1A, 1B, and ID. In each instance when the sensor is activated, an intent message having an address peculiar to the shower head 40 will be sent to the receiver 45 at the shower head. Its associated transmitter 43 will send an acknowledge or answerback message to the sensor so that the indicator 44*a* will be illuminated. The messages have an address which is unique to that specific appliance and that specific sensor so as to avoid operation of unwanted appliances and confusion in the answerback system. In this connection, although an LED is shown as the indicator, it is equally within the scope of the invention to have an audible answerback or acknowledgment.

Figure 2:
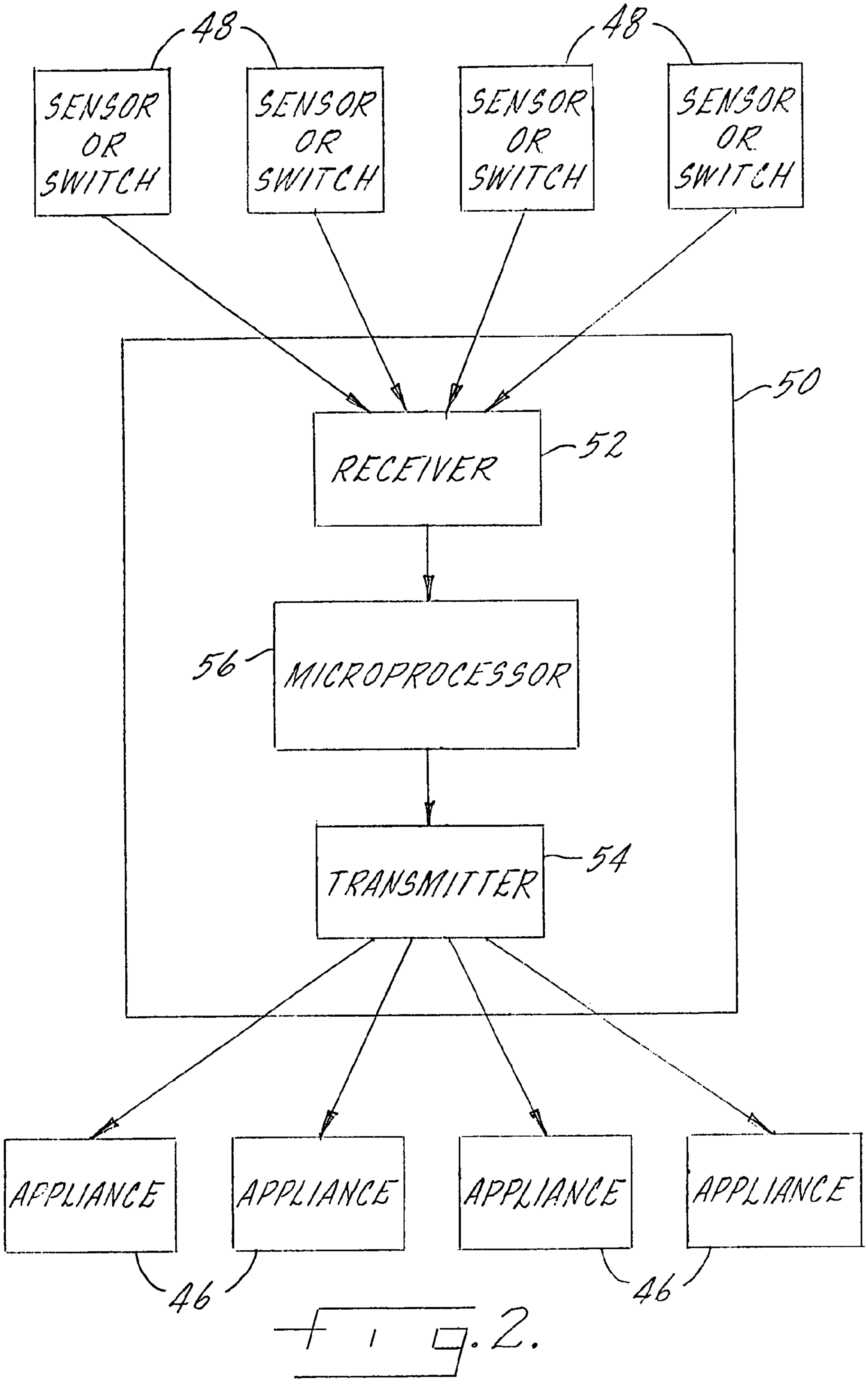
FIG. 2 illustrates a control system for multiple appliances of the type described in FIG. 1.

FIG. 2 diagrammatically illustrates a control board for use in a washroom having one or more or all of the appliances described in FIGS. 1A, 1B, 1C, and 1D. There may be multiple flush valves, multiple faucets, multiple soap dispensers, multiple paper towel dispensers, multiple hand dryers and one or more shower heads in a single washroom environment or in the washroom of an institution. Such appliances are shown at 46. The triggering devices for such appliances, either sensor or switch, are shown at 48. A control board is indicated at 50 and it may include a radio receiver 52 and a radio transmitter 54. There is a microprocessor 56 within the control board and the microprocessor may be one of the type shown in U.S. Pat. Nos. 6,038,519 and 5,966,753 owned by Sloan Valve Company of Franklin Park, Ill., assignee of the present application. The disclosure of these two patents is herein incorporated by reference.

Specifically, such disclosure provides a hard wired control system in which there are multiple inputs from multiple appliances and multiple outputs from the microprocessor hard wired to various appliances in such a way that a sensor will provide an indication that there is an intent to operate a specific appliance and the microprocessor will determine, upon the data stored therein, whether it is appropriate to operate that appliance and, if so, for what period of time. Further, there may be programmed flushing of various flush valves, as shown in U.S. Pat. No. 5,235,706, also owned by Sloan Valve Company, and again the disclosure of which is incorporated by reference. The microprocessor 56 is designed, as described in the above U.S. patents, to control the operation of multiple personal hygiene or sanitary appliances within a particular location and the communication with such appliances is over wiring which physically connects the sensor, the control board and the appliance. The system illustrated in FIG. 2 provides radio control between a sensor 48, the control board and the appliance 46. Further, it will employ the acknowledgment or answerback system of FIGS. 1A, 1B, 1C, and 1D. More specifically, any one or all of the appliances described in those figures, or multiples of such appliances, may all send radio signals which will be received by the receiver 52. Since each of those signals will have a different address, or appliance designation, that information will be passed to the processor which in turn will perform its functions relative to operation of the appliance.

As an example, when a radio signal is received at the receiver 52, the microprocessor 56 will determine which address has made a request. The microprocessor will then instruct the transmitter 54 to send an acknowledgment to that particular sensor or pushbutton, as the case may be, at its predetermined address acknowledging receipt of the specific request to operate an appliance.

The microprocessor, by the programs stored therein, will then determine if the appliance should be operated and, if so, for how long. For example, if there is a limit as to the number of flush valves that can be simultaneously operated, as disclosed in the '706 patent, then the microprocessor may delay operation of one or more flush valves. Further, in an institutional environment, in order to avoid problems with vandalism, it may be desired not to operate a urinal or a water closet every time there is a demand for its operation, but to do so in accordance with a predetermined program.

When it is desired that an appliance be operated, a signal will be sent by the transmitter 54 to the receiver associated with that appliance. The receiver will provide an answerback, just as described in connection with FIGS. 1A, 1B, 1C and 1D. The particular appliance, soap dispenser, shower head, paper towel dispenser, faucet or flush valve, will then be operated for the predetermined time which has been programmed for its operation by the microprocessor 56.

Each appliance will have a specific address, which address will be recognized by the microprocessor. Each answerback signal will be specific to an appliance and the answerback initially given to the sensor will have a different address than the answerback sent from the appliance back to the control board 50.

Whereas the preferred form of the invention has been shown and described herein, it should be realized that there may be many modifications, substitutions and alterations thereto.

The embodiments of the invention in which an exclusive property or privilege is claimed are defined as follows:

1. A system for remote operation of a personal hygiene appliance which is one of a toilet flush valve, a urinal flush valve, a faucet, a shower head, a soap dispenser, a hand dryer, and a paper towel dispenser (appliance), said system including the appliance, an electric operator for controlling operation of said appliance, an appliance radio receiver connected electrically to said operator to provide an activating signal thereto, an appliance radio transmitter connected to said appliance radio receiver, means remote from said appliance, for signaling an intent to cause operation of said appliance, a remote radio transmitter connected to said means for signaling an intent and operable thereby, an indicator located at said means for signaling an intent, a remote radio receiver connected to said indicator to provide an operating signal therefor, said remote radio transmitter being programmed to transmit a message unique to said means for signaling an intent (intent message), upon being activated by said means for signaling an intent, said appliance receiver being programmed to receive said intent message and upon receipt thereof to cause operation of said electric operator and to cause said appliance transmitter to send a message unique to said appliance (acknowledge message) to said remote receiver to acknowledge receipt of said intent message, said remote receiver, upon receipt of said acknowledge message, causing activation of said indicator, wherein said intent message includes an address unique to a specific appliance, and said acknowledge message includes an address unique to a specific appliance, but differing from the address of said intent message.

2. The system of claim 1 wherein said means for signaling an intent includes an infrared sensor.

3. The system of claim 1 wherein said means for signaling an intent includes a manually activated switch.

4. The system of claim 1 wherein said means for signaling an intent includes an infrared sensor and a manually activated switch.

5. The system of claim 1 wherein said appliance is a flush valve connected to operate a urinal.

6. The system of claim 1 wherein said appliance is a flush valve connected to operate a water closet.

7. The system of claim 1 wherein said appliance is a faucet.

8. The system of claim 1 wherein said appliance is a soap dispenser.

9. The system of claim 1 wherein said appliance is a shower head.

10. The system of claim 1 wherein said appliance is a paper towel dispenser.

11. The system of claim 1 wherein said appliance is a hand dryer.

12. The system of claim 1 wherein said indicator is a light emitting diode.

13. A system for remote operation of at least one personal hygiene appliance including one or more of a toilet flush valve, a urinal flush valve, a faucet, a shower head, a soap dispenser, a hand dryer, and a paper towel dispenser, the system including at least one of said appliance, an electric operator associated with each appliance for causing operation thereof, a radio receiver associated with each appliance, which, upon receipt of a message unique to that appliance will cause operation of its associated electric operator, means, remote from and associated with each personal hygiene appliance for signaling an intent to cause operation of that appliance, a remote radio transmitter connected to each means for signaling an intent, each remote radio transmitter being programmed to transmit a message unique to its specific appliance (intent message), a central processing unit (CPU) having a microprocessor, a radio receiver and a radio transmitter connected thereto, the CPU radio receiver being capable of receiving intent messages from all remote radio transmitters and the CPU radio transmitter being capable of sending messages (operate messages) to all appliance radio receivers, the microprocessor being programmed upon receipt of an intent message from a specific transmitter, unique to that transmitter's associated appliance, of causing the CPU transmitter to send an operating message, unique to the receiver associated with that appliance for causing operation of its electric operator.

14. The system of claim 13 wherein the means, remote from an appliance for signaling an intent, includes an infrared sensor.

15. The system of claim 13 wherein the means, remote from an appliance for signaling an intent, includes a manually activated switch.

16. The system of claim 13 wherein the means, remote from an appliance for signaling an intent, includes an infrared sensor and a manually activated switch.

17. The system of claim 13 wherein each intent message has an address unique to a specific appliance and each operating message has an address unique to a specific appliance, which address is different from the intent message address for that appliance.

18. The system of claim 13 wherein each means for signaling an intent has a radio receiver, each means for signaling intent has an indicator associated therewith, which is operable by the associated radio receiver, receipt of an intent message at the CPU receiver, causing the microprocessor to have the CPU transmitter send an acknowledge message to the receiver whose means for signaling an intent caused the sending of an intent message, receipt of an acknowledge message causing operation of an indicator.

19. The system of claim 18 wherein each appliance has a radio transmitter, the receipt of an operate message at an appliance radio receiver, will cause the appliance radio receiver to have its associated radio transmitter send an acknowledge message to the CPU receiver.

20. The system of claim 18 wherein each indicator is a light emitting diode.

* * * * *